US007378949B2

(12) United States Patent
Chen

(10) Patent No.: US 7,378,949 B2
(45) Date of Patent: May 27, 2008

(54) VEHICLE SAFETY SYSTEM AND VEHICLE HAVING THE SAME

(75) Inventor: Ga-Lane Chen, Guangdong (CN)

(73) Assignee: Hon Hai Precision Industry Co., Ltd.., Tu-Cheng, Taipei Hsien (TW)

( * ) Notice: Subject to any disclaimer, the term of this patent is extended or adjusted under 35 U.S.C. 154(b) by 205 days.

(21) Appl. No.: 11/306,492

(22) Filed: Dec. 29, 2005

(65) Prior Publication Data

US 2006/0208874 A1    Sep. 21, 2006

(30) Foreign Application Priority Data

Mar. 14, 2005   (CN)   .................. 2005 1 0033671

(51) Int. Cl.
*B60Q 1/00* (2006.01)

(52) U.S. Cl. .................. 340/438; 180/270; 340/435; 701/300

(58) Field of Classification Search ................ 340/438
See application file for complete search history.

(56) References Cited

U.S. PATENT DOCUMENTS

| | | | | |
|---|---|---|---|---|
| 5,355,118 A | | 10/1994 | Fukuhara | |
| 6,545,601 B1 * | | 4/2003 | Monroe | 340/521 |
| 6,703,944 B1 * | | 3/2004 | Obradovich | 340/903 |
| 6,975,932 B2 * | | 12/2005 | Obradovich | 701/96 |
| 7,049,953 B2 * | | 5/2006 | Monroe | 340/521 |
| 7,162,370 B2 * | | 1/2007 | Obradovich | 701/301 |
| 7,173,526 B1 * | | 2/2007 | Monroe | 340/521 |
| 2003/0067542 A1 * | | 4/2003 | Monroe | 348/148 |
| 2004/0017284 A1 | | 1/2004 | Flick | |
| 2007/0171037 A1 * | | 7/2007 | Schofield et al. | 340/438 |

\* cited by examiner

*Primary Examiner*—George Bugg
(74) *Attorney, Agent, or Firm*—Winston Hsu

(57) ABSTRACT

A vehicle safety system for use in a vehicle includes a plurality of image pick-up systems adapted for being mounted on the vehicle, the image pick-up systems being configured for recording video images of inside and/or outside statuses of the vehicle; and a computer system connected to the image pick-up systems, the computer system comprising a signal transmitting device configured for transmitting the video images to an intended receiver for help upon occurrence of an mishap accident. A vehicle having such safety system is also provided.

14 Claims, 2 Drawing Sheets

VEHICLE SAFETY SYSTEM AND VEHICLE HAVING THE SAME

FIELD OF THE INVENTION

The present invention relates generally to a safety system, and particularly to a safety system for use in vehicles.

DESCRIPTION OF THE RELATED ART

In modern society, automobiles are more and more popular as important transportation tools. However, traffic accidents are increasing along with the booming development of automobiles. In addition to human factors such as drink driving or high speed driving, main reasons for traffic accidents are generally associated with objective factors including, poor visibility, and blind zones in normal field of vision.

A typical safety device for an automobile includes a number of signal transmitters and receivers mounted in the automobile. When the automobiles equipped with the safety devices meet each other, they can transmit and receive signals to and from each other so as to inform drivers to avoid a traffic accident.

Another typical safety device for an automobile includes a laser transmitting and receiving system, a speed sensor, and a central processing unit (CPU). The safety device can inform the driver of information such as distance between other ambient automobiles or barriersby audio or video means.

Another conventional safety device includes a miniature camera configured for monitoring a blind zone of the driver and showing the images to the driver via a display screen.

However, when a fatal traffic accident happens, the driver might be injured seriously such that the driver cannot ask for help by himself/herself. For this reason, many drivers lost their lives in traffic accidents because of not being saved in time.

Therefore, a vehicle safety system can automatically send signals for help and a vehicle having such safety system are desired.

SUMMARY OF THE INVENTION

A vehicle safety system for use in a vehicle comprises a plurality of image pick-up systems adapted for being mounted on the vehicle, the image pick-up systems being configured for recording video images of inside and/or outside statuses of the vehicle; and a computer system connected to the image pick-up systems, the computer system comprising a signal transmitting device configured for transmitting the video images to an intended receiver for help upon occurrence of an mishap accident.

A vehicle having a main body and a vehicle safety system mounted thereon, the vehicle safety system comprises a plurality of image pick-up systems adapted for being mounted on the vehicle, the image pick-up systems being configured for recording video images of inside and/or outside statuses of the vehicle; and a computer system connected to the image pick-up systems, the computer system comprising a signal transmitting device configured for transmitting the video images to an intended receiver for help upon occurrence of an mishap accident.

Other advantages and novel features of the present invention will become more apparent from the following detailed description of preferred embodiment when taken in conjunction with the accompanying drawings, in which:

BRIEF DESCRIPTION OF DRAWINGS

Many aspects of the present safety system can be better understood with reference to the following drawings. The components in the drawings are not necessarily to scale, the emphasis instead being placed upon clearly illustrating the principles of the present safety system. Moreover, in the drawings, like reference numerals designate corresponding parts throughout the several views.

The exemplifications set out herein illustrate at least one preferred embodiment of the invention, in one form, and such exemplifications are not to be construed as limiting the scope of the invention in any manner.

DETAILED DESCRIPTION

Figure 1:
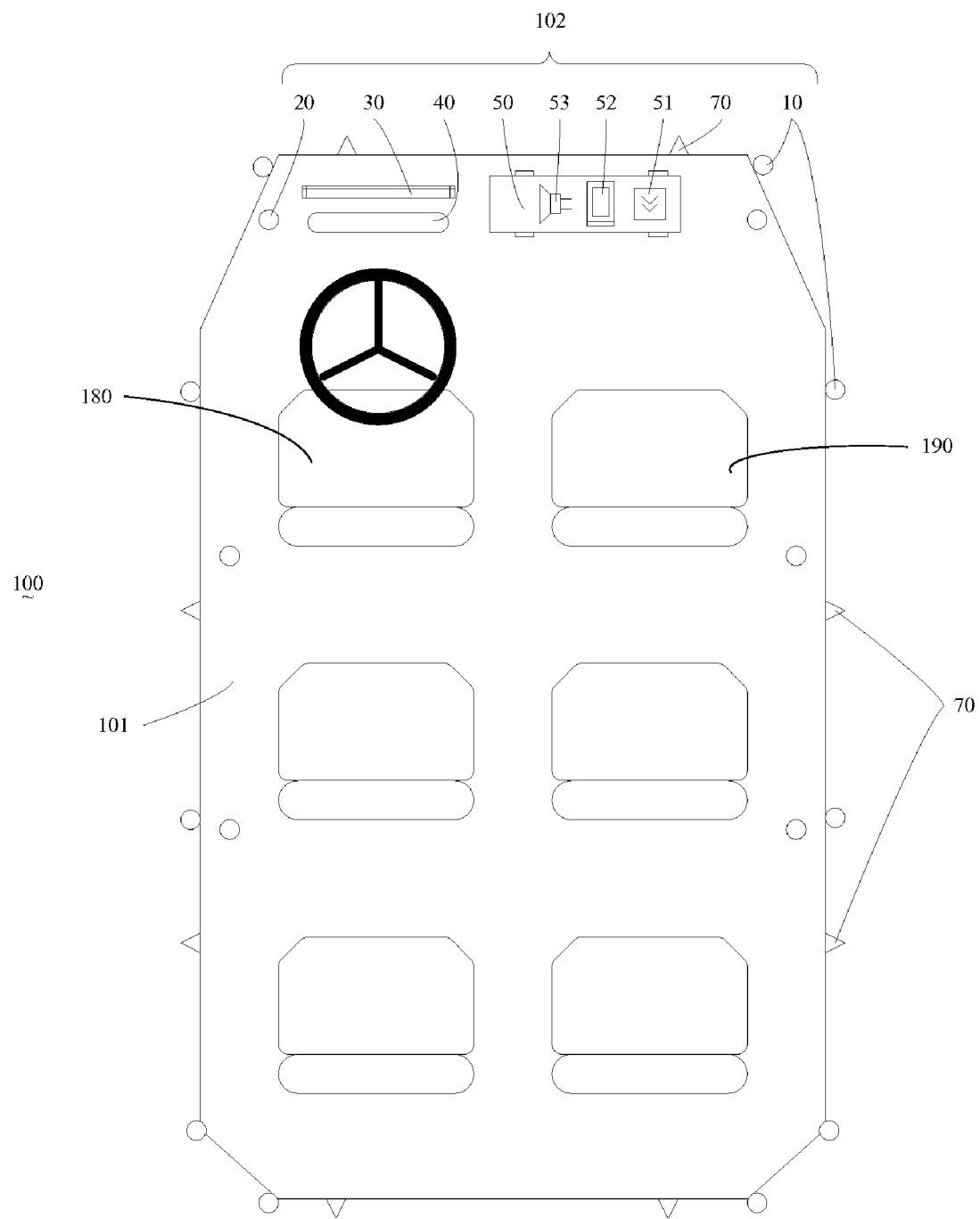
FIG. 1 is a schematic, top view of a vehicle having a safety system mounted therein according to a preferred embodiment.

Referring to FIG. 1, a vehicle and a vehicle safety system according to a preferred embodiment are illustrated. The vehicle 100 having a main body 101 and a vehicle safety system 102 mounted thereon. The vehicle can be a typical passenger automobile with a driver's seat 180 and five passenger seats 190. The vehicle safety system 102 includes: a number of inner image pick-up systems 10 mounted outside the vehicle 100, a number of outer image pick-up systems 20 mounted inside the vehicle 100, a monitor display 30, an air bag restraint system 40, and a computer system 50. The computer system 50 is connected to the inner and outer image pick-up systems 10 and 20, the monitor display 30, and the air bag restraint system 40. The computer system 50 comprises a storage device 51 and a signal transmitting device 52.

Figure 2:
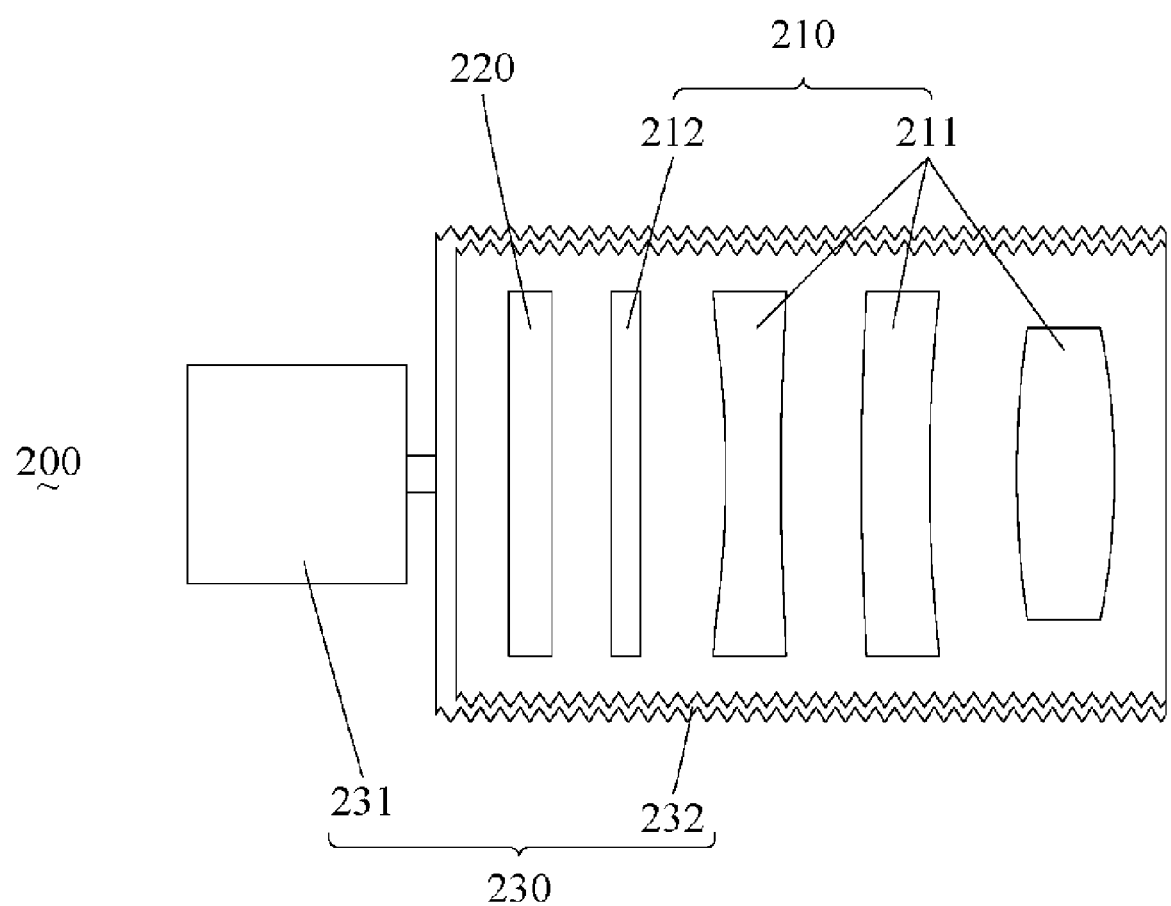
FIG. 2 is a schematic view of an image pick-up system according to the preferred embodiment.

Referring to FIG. 2, the inner and outer image pick-up systems 10 and 20 each include an autofocus zoom lens systems 200. The autofocus zoom lens system 200 includes an optical module 210, a sensor 220, and a driving module 230. The optical module 210 includes a plurality of aspheric lens 211 and an infrared filter 212. More preferably, the aspheric lens 211 has anti-reflect coatings on both surfaces thereof. The sensor 220 can be a CMOS (complementary metal-oxide semiconductor) sensor, or a CCD (charged coupled device) sensor. The driving module 230 includes an actuator 231 and an extendable barrel 232. The actuator 231 may be selected from the group consisting of a step motor, a voice coil motor, and a microelectromechanical motor. In this exemplary embodiment, the optical module 210 includes three aspheric lenses 211. The sensor 220 is a CCD sensor. The actuator 231 is a microelectromechanical motor. It is noted that, more lenses can be used in order to get better resolution and zoom ability.

The outer image pick-up systems 10 can be arranged at front side, back side, and two lateral sides of the vehicle 100 for monitoring the environmental traffic status around the vehicle 100 via the autofocus zoom lens systems 200. The inner image pick-up systems 20 can be arranged spatially corresponding to the seats of the vehicle 100 for monitoring the status of passengers in the vehicle. Video image captured by the image pick-up systems 10 and 20 can be transferred to the computer system 50. The driver can selectively choose to view a desired video image displayed on the monitor display 30. Alternatively, more monitoring video images can be displayed on the monitor display 30 at the same time.

The computer system 50 can save the video images into the storage device 51, and send the video images to intended receivers in a form of RF (radio frequency) signals via the signal transmitting device 52. For example, the computer system 50 may be preset to send the video images to the owner of the vehicle 100, even though the vehicle 100 has been stolen. The video images can be provided to the police for aiding them in solving the case. For example, when a traffic accident happens, the CPU of the air bag restraint system 40 may send an instruction and controll a gas generator (not shown) to instantly inflate an air bag (not shown). At the same time, the computer system 50 receives the instruction and then controls the signal transmitting device 52 to send RF signals for help and video images to the intended receivers such as a hospital, a police station, a fire station etc. Even though the driver or the passengers are too seriously injured to ask for help themselves, the receivers can still get detailed information about the accident, such as the states of the injured driver or the passengers and the status of the vehicle 100 and the accident scene. Thereby, succors can take timely measures without unduly delay. Thus the property damage and physical injury can be minimized.

Furthermore, the vehicle safety system 102 includes a number of detectors 70 connected to the computer system 50. The computer system 50 further comprises an annunciator 53. The detectors 70 can be arranged at front side, back side, and two lateral sides of the vehicle 100. The detectors are configured for detecting distances between the vehicle 100 and ambient vehicles or objects, and sending the distance data to the computer system 50. When distance detected by the detectors 70 is less than a safety distance, the computer system 50 will send out sound alerts to prompt the driver via the annunciator 53. The annunciator 53 can provide prompts in various forms for example human voice prompts. So, even though the driver overlooks the video images displayed on the monitor display 30, the annunciator 53 can still prompt the driver with sound alerts. As a result, potential risks of a traffic accident can be further minimized.

The vehicle safety system has real time image pick-up systems and a signal transmitting device. This configuration helps the driver to instantly monitor the status around the vehicle anytime. Even though a mishap accident, for example, the driver unfortunately get a serious heart attack, and can't ask for help himself/herself, or otherwise for example, a traffic accident happens, and the driver or the passengers are too seriously injured to ask for help themselves, the signal transmitting device can still send signals and real time video images to intended receivers for help. In addition, the image pick-up system using optical systems with aspheric lenses have advantages such as compact and lightweight.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vehicle safety system for use in a vehicle, comprising: a plurality of image pick-up systems adapted for being mounted on the vehicle, the image pick-up systems being configured for recording video images of inside and/or outside statuses of the vehicle, each of the image pick-up systems comprising an autofocus zoom lens system having a plurality of aspheric lenses and an infrared filter, the aspheric lenses each having anti-reflect coating on both surface thereof; a computer system connected to the image pick-up systems, the computer system comprising a signal transmitting device configured for transmitting the video images in a form of radio frequency signals to an intended receiver for help upon occurrence of an mishap accident; an air bag restraint system connecting with the computer system; and a plurality of detectors connecting with the computer system and being configured for detecting distance between the vehicle and ambient vehicles and sending the distance data to the computer system.

2. The vehicle safety system of claim 1, wherein the computer system further comprises a storage device configured for the storage of the video images.

3. The vehicle safety system of claim 1, wherein the computer system further comprising an annunciator.

4. A vehicle having a main body and a vehicle safety system mounted thereon, the vehicle safety system comprising: a plurality of image pick-up systems adapted for being mounted on the vehicle, the image pick-up systems being configured for recording video images of inside and/or outside statuses of the vehicles, the image pick-up systems being mounted both inside and outside the vehicle, each of the image pick-up systems comprising an autofocus zoom lens system having a plurality of aspheric lens and an infrared filter; a computer system connected to the image pick-up systems, the computer system comprising a signal transmitting device configured for transmitting the video images in a form of radio frequency signals to an intended receiver for help upon occurrence of an mishap accident; an air bag restraint system connecting with the computer system and a plurality of detectors connecting with the computer system and being configured for detecting distance between the vehicle and ambient vehicles and sending the distance data to the computer system.

5. The vehicle of claim 4, wherein the image pick-up systems mounted inside the vehicle are arranged spatially in correspondence with seats of the vehicle.

6. The vehicle of claim 4, wherein the computer system further comprises a storage device configured for the storage of the video images.

7. The vehicle of claim 4, wherein the computer system further comprising an annunciator.

8. The vehicle safety system of claim 1, wherein the autofocus zoom lens system further comprises a microelectromechanical motor configured for driving the plurality of aspheric lenses.

9. The vehicle safety system of claim 8, wherein the plurality of aspheric lenses are three aspheric lenses.

10. The vehicle of claim 4, wherein the detectors are arranged at front side, back side, and two lateral sides of the vehicle.

11. The vehicle of claim 4, wherein the autofocus zoom lens system further comprises a microelectromechanical motor configured for driving the plurality of aspheric lenses.

12. The vehicle of claim 11, wherein the plurality of aspheric lenses are three aspheric lenses.

13. The vehicle of claim 11, wherein the aspheric lenses each having anti-reflect coating on both surface thereof.

14. The vehicle of claim 4, wherein the vehicle is an automobile.

* * * * *